United States Patent [19]

Martin et al.

[11] Patent Number: 5,079,953
[45] Date of Patent: Jan. 14, 1992

[54] PRESSURE GAGE

[75] Inventors: Rainer Martin, Loerrach; Georg Schneider, Schopfheim-Langenau, both of Fed. Rep. of Germany

[73] Assignee: Endress u. Hauser GmbH u. Co., Fed. Rep. of Germany

[21] Appl. No.: 554,801

[22] Filed: Jul. 18, 1990

[51] Int. Cl.[5] ............................ G01L 7/08; G01L 9/12
[52] U.S. Cl. .......................... 73/718; 73/431; 73/756; 361/283
[58] Field of Search ................. 73/756, 431, 706, 708, 73/715-728; 361/283

[56] References Cited

U.S. PATENT DOCUMENTS

| | | | |
|---|---|---|---|
| 4,222,277 | 9/1980 | Kurtz | 73/721 |
| 4,347,744 | 9/1982 | Buchanan | 73/715 |
| 4,414,851 | 11/1983 | Maglic | 73/706 |
| 4,595,342 | 6/1986 | Christlieb et al. | 73/727 |
| 4,895,026 | 1/1990 | Tada | 73/721 |

FOREIGN PATENT DOCUMENTS 3235947 12/1983 Fed. Rep. of Germany .
WO87/07375 12/1987 PCT Int'l Appl. .

Primary Examiner—Donald O. Woodiel
Attorney, Agent, or Firm—Barnes & Thornburg

[57] ABSTRACT

This pressure gage has a housing (b 10) with a first connection (1) for applying a first pressure (p1), an interior space (11) for receiving, mounting, and sealing a sensing element (3..), a wall (12) enclosing the interior space and having a channel (41) therein for guiding reference air or a second pressure (p2), and a cover (5). The sensing element (3..) comprises a diaphragm (31), to the outer side of which the first pressure (p1) is applied, and a substrate (32) having an opening (33) through which pressure is applied to the inner side of the diaphragm (31). The cover (5) has at least one feedthrough bushing (51) for electric leads (52) to the sensing element, means for sealing the interior space (11) from the environment of the pressure gage, a channel extension (42) extending the channel (41) in the wall (12) to an opening in the cover, and an inset which is sealed in the opening of the cover and which either is solid (inset 61) or has a connecting channel (43) between the channel extension (42) and a lengthening part (34) extending from the inner plane of the cover (5) to the opening (33) in the substrate (32) of the sensing element (inset 62) or is designed as a second connection (2) for applying the second pressure (p2), said second connection closing the channel extension (42) (inset 63). This construction serves to provide a pressure gage which is modifiable for use as either an absolute pressure or reference pressure or differential pressure gage and requires a minimum number of different parts adapted to the respective applications, and wherein one of the pressure connections can be fitted in one of the two main surfaces of the pressure gage.

8 Claims, 2 Drawing Sheets

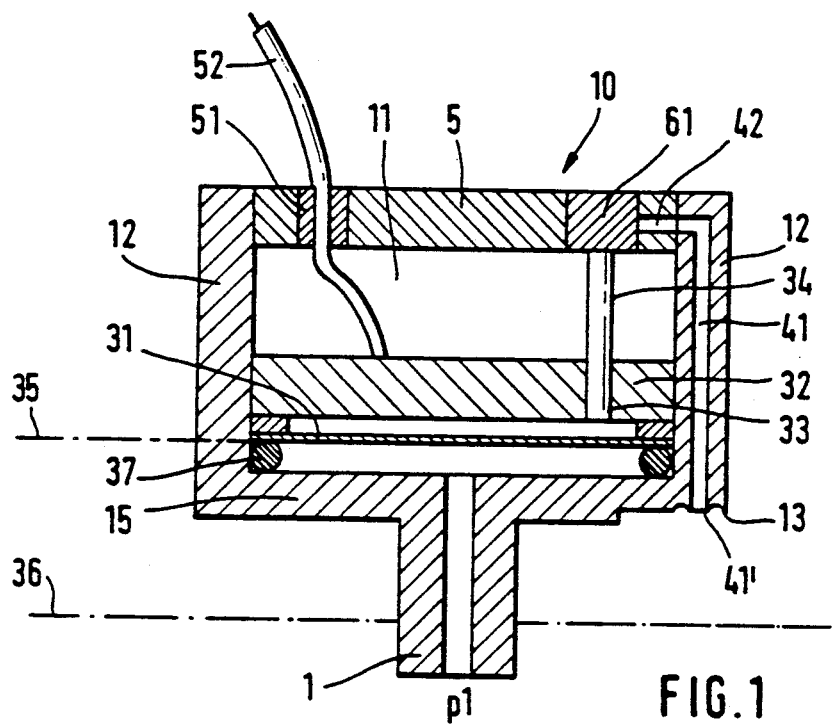
FIG.1
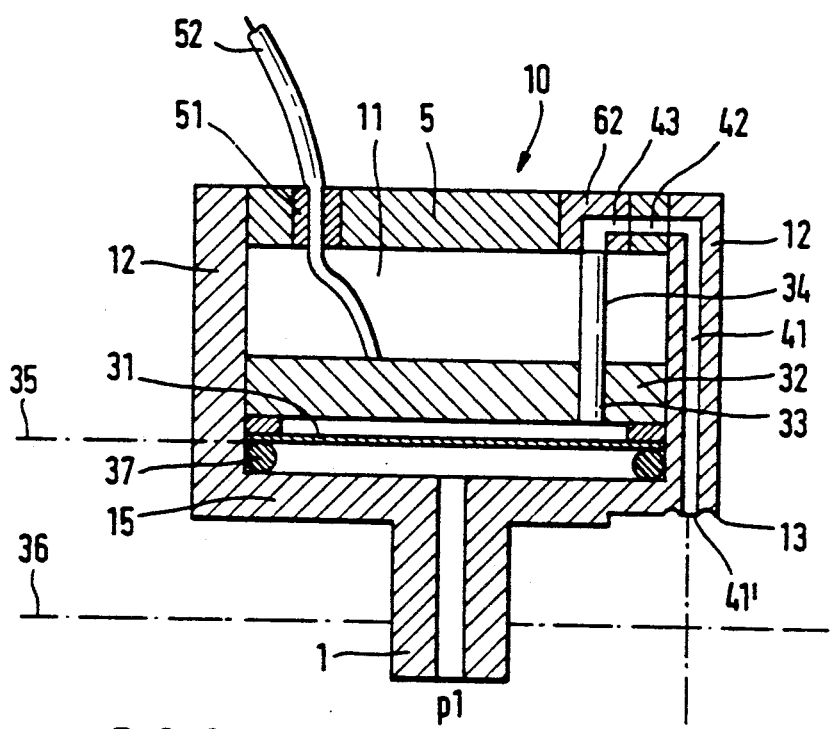
FIG.2
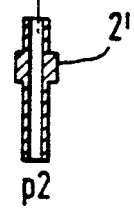

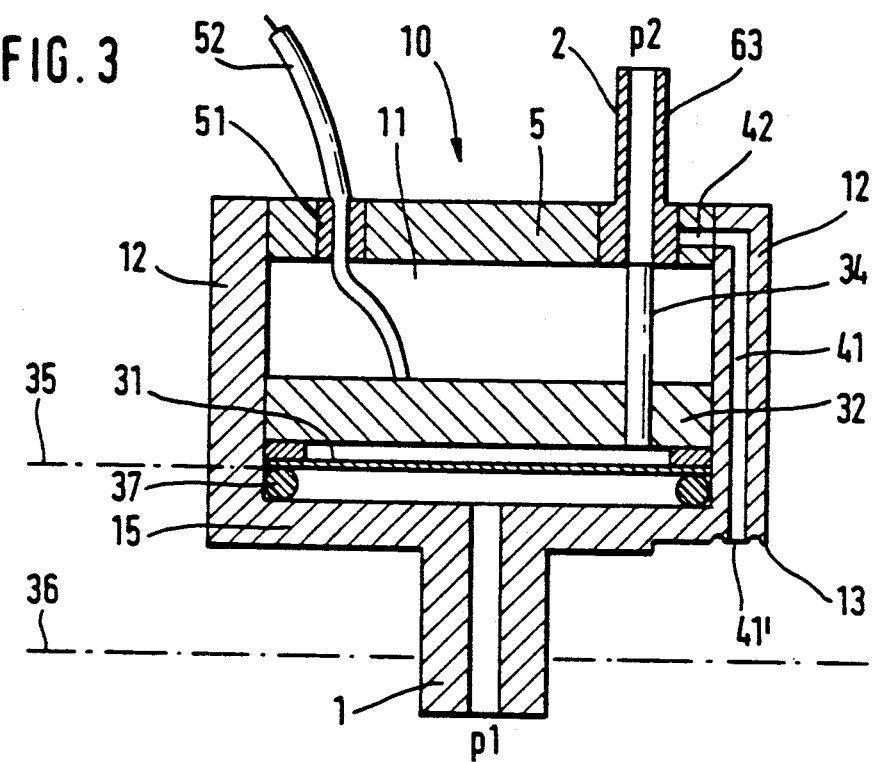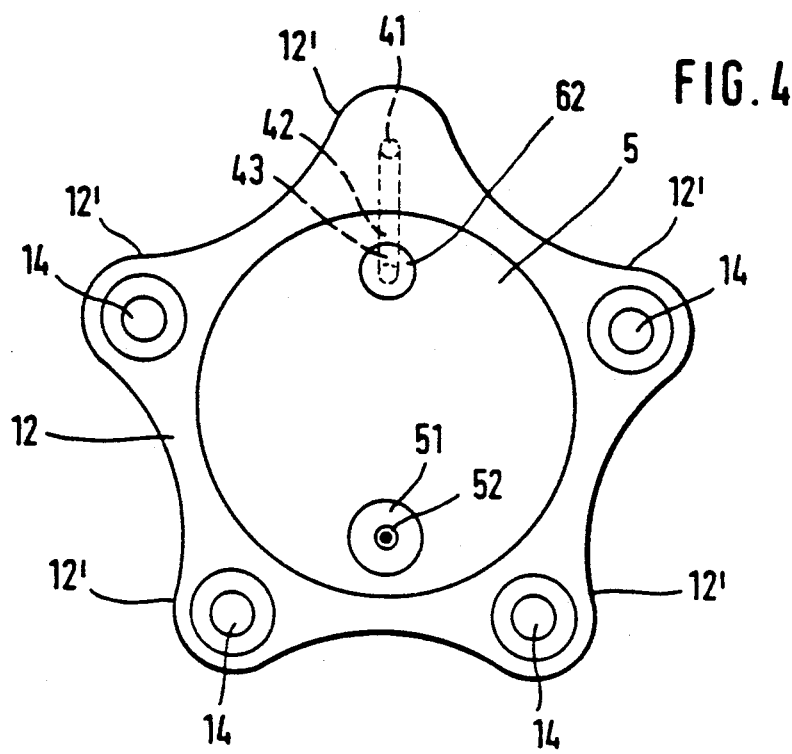

PRESSURE GAGE

The invention consists in a pressure gage with a housing having a first connection for applying a first pressure, an interior space for receiving, mounting, and sealing a sensing element, a wall enclosing the interior space and having a channel therein for guiding reference air or a second pressure, and a cover. The sensing element comprises a diaphragm, to the outer side of which the first pressure is applied, and a substrate having an opening through which pressure is applied to the inner side of the diaphragm. The cover has at least one feedthrough bushing for electric leads to the sensing element, means for sealing the interior space from the environment of the pressure gage, a channel extension extending the channel in the wall to an opening in the cover, and an inset which is sealed in the opening in the cover and which either is solid or has a connecting channel between the channel extension and a lengthening part extending from the inner plane of the cover to the opening in the substrate of the sensing element or is designed as a second connection for applying the second pressure, said second connection closing the channel extension.

It is the object of the invention to provide a pressure gage which is modifiable for use as either an absolute pressure or reference pressure or differential pressure gage and requires only a minimum number of different parts adapted to the respective application, and wherein one of the pressure connections can be fitted in the cover or bottom alternatively.

According to a development of the invention, portions of the housing wall may be thickened so as to serve as mounting aids. In that case, it is particularly advantageous to shape at least two of the thickened portions so as to permit the transmission of a screw-in torque, i.e., the screwing of the pressure gage into a thread present at the pressure-measuring point. In the latter case, it is advantageous to provide a mounting hole in at least one of the thickened portions, so that after the pressure gage has been screwed into the aforementioned thread, for example, it can be additionally secured by at least one bolt against loosening in the thread. But even if the pressure is applied to the first connection in a nonrigid fashion, mounting holes will be of advantage.

In the aforementioned developments of the invention with the thickened wall portions, the channel advantageously runs in one of said thickened portions. According to a further advantageous aspect of the invention and the aforementioned developments, an offset drip edge is provided at the outlet of the channel.

In a pressure gage with the inset containing the connecting channel, the second connection for applying the second pressure is inserted in the outlet of the channel. In another variant of the pressure gage with the inset containing the connecting channel, the outlet of the channel is located between the diaphragm plane and the mounting plane.

The invention as well as embodiments and developments thereof will now be explained in greater detail with reference to the accompanying drawings, in which:

FIG. 1 is a schematic cross-sectional view of an embodiment of the first variant of the solution according to the invention;

FIG. 2 is a schematic cross-sectional view of an embodiment of the second variant of the solution;

FIG. 3 is a schematic cross-sectional view of an embodiment of the third variant of the solution according to the invention, and FIG. 4 is a plan view of a preferred development of the invention.

In the embodiment of the first variant of the solution according to the invention shown in FIG. 1 in a schematic cross-sectional view, the housing 10 of the pressure gage comprises the interior space 11 enclosed by it, the wall 12, of which sectional areas can be seen in FIG. 1—as well as in FIGS. 2 and 3—at the left and right, the housing bottom 15, and the first connection 1 for applying the first pressure p1, which connection passes into this bottom. The end portion of this connection may have a screw thread for screwing it into a corresponding female thread at the pressure-measuring point, which female thread ends in the mounting plane 36.

On the inner side of the housing bottom 15, the sensing element, consisting of the diaphragm 31 and the substrate 32, is fitted tightly, as is shown by the packing ring 37 indicated between the inner side of the housing bottom 15 and the diaphragm 31. The substrate contains the opening 33, which is adjoined by the lengthening part 34, e.g., a tubule inserted and sealed in the opening 33. By means of the opening 33, it is possible to either seal the space between diaphragm 31 and substrate 32—compare the spacers indicated at the edges of diaphragm and substrate, by which these two parts are permanently joined together—from the environment of the pressure gage, as is shown in FIG. 1 and will be explained below in greater detail, or apply reference air or a second pressure to this space, as shown in FIG. 2 and 3.

The sensing element 3 can be any conventional sensing element suitable for measuring pressure. Therefore, the construction of the sensing element is shown in FIGS. 1 to 3 only highly schematically; the plates provided on the diaphragm and on the inner side of the substrate—if the sensing element is a capacitive type—are not shown, particularly for reasons of simplicity.

The cover 5, sealed in the wall 12 on the side opposite the housing bottom 15, contains the feedthrough bushing 51 for the electric leads 52 to the sensing element, which, as usual, need not run directly to the electrodes of the sensing element but are connected to a microcircuit which may be disposed on or near the substrate 32 and is, in turn, connected to the electrodes of the sensing element.

Furthermore, in the variant of the solution shown in FIG. 1, an opening in the cover 5 contains the solid inset 61, which is fitted therein in a gas-tight manner and seals both the interior space 11 and—as mentioned above—the space between diaphragm and substrate. It is also possible, however, to use a sensing element which was already sealed and whose interior space may already been evacuated.

The wall 12, as illustrated in the right-hand portion of FIG. 1, contains the channel 41, which passes into the channel extensions 42 in the cover 5, which extension, in turn, ends in the above-mentioned opening in the cover. Thus, in the embodiment of FIG. 1, the inset 61 also seals the passage formed by the channel extension 42 and the channel 41, which passage communicates with the environment of the pressure gage via the outlet 41′.

In a preferred embodiment of the invention, this outlet 41' is located between the diaphragm plane 35 and the mounting plane 36, as shown in FIG. 1. In a further embodiment, it may be provided with a drip edge 13 which is slightly set off from the housing bottom 15. The purpose and advantages of this preferred embodiment will be described in connection with the variant of the solution shown in FIG. 2.

Since the space between diaphragm and substrate is hermetically sealed from the environment of the pressure gage, the first variant of the solution, shown in FIG. 1, is an absolute-pressure gage if this space is suitably evacuated.

If, on the other hand, the solid inset 61 of FIG. 1 is replaced by the inset 62 of the embodiment of the second variant of the solution shown in FIG. 2, which contains the connecting channel 43 between the channel extension 42 and the lengthening part 34, this pressure gage can be used as either a reference pressure gage or a differential pressure gage. In the latter case, the second connection 2' for applying the second pressure p2 is inserted into the outlet 41' of the channel 41. In the former cases, the space between diaphragm and substrate communicates with the environment of the pressure gage via the outlet 41'.

In that case, the above-mentioned, advantageous location of the outlet 41' between the diaphragm plane 35 and the mounting plane 36 is particularly advantageous in that the temperature of the air in the space between diaphragm and substrate and in the passage connecting this space with the outlet 41' cannot fall below the dew point at the diaphragm even if the temperature at the mounting plane 36 is lower than the ambient temperature. Because of the temperature gradient then present in the pressure gage—connection 1, housing bottom 15, wall 12, and cover 5 are essentially metallic—, the outlet 61' will always be at a lower temperature than the diaphragm plane 35, so that condensation will always take place only in the plane of the outlet.

The other details of FIG. 2 are identical to the corresponding parts of FIG. 1, so that they need not be explained again.

In the embodiment of the third variant of the solution according to the invention shown in FIG. 3, the solid inset 61 of FIG. 1 or the inset 62 of FIG. 2, which contains the connecting channel 43, has been replaced by the inset 63, which is designed as the second connection 2, via which the second pressure p2 is applied to the sensing element, and which seals the channel extension 42 in the same manner as the solid inset 61 of FIG. 1. Thus, this third variant of the solution can be used as a differential-pressure gage with pressure connections located essentially opposite each other.

As the other details of the arrangement of FIG. 3 are identical to the corresponding details of the arrangement of FIG. 1, they will not be explained again.

FIG. 4 shows a plan view of a preferred embodiment of the invention which can be used with all three variants of the solution. Portions of the wall 12 shown in FIGS. 1 to 3 are thickened so as to serve as mounting aids, particularly to transmit a screw-in torque. FIG. 4 shows an embodiment having five thickened portions 12' which are evenly distributed around the periphery and are essentially shaped so as to give the five-part arrangement of a sanitary knob. In a further embodiment of the invention, part of the thickened portions have a mounting hole 14; in FIG. 4, these are all thickened portions 12 except those in which the channel 41 runs.

Of the three possible insets, the inset 62 of FIG. 2 has been assumed in FIG. 4; accordingly, the channel extension 42 and the connecting channel 43 are indicated in FIG. 4. Also indicated are the cover 5, the feedthrough bushing 51, and the electric leads 52.

The invention thus makes it possible to produce with few standardized component parts - housing bottom with wall 12, which can be made as one piece, e.g., a turned or injection-molded part, sensing element 3.., and cover 5 with only three different insets, and the second connection 2' if necessary—a pressure gage which is easily adaptable to different requirements, and the warehousing of which is greatly simplified because it can be limited essentially to the three different insets 61, 62, 63 and gages of otherwise identical construction.

What is claimed is:

1. Pressure gage with a housing having
   a first connection for applying a first pressure,
   an interior space for receiving, mounting, and sealing
      a sensing element comprising
         a diaphragm to the outer side of which the first pressure is applied, and
         a substrate having an opening through which pressure is applied to the inner side of the diaphragm,
   a wall enclosing the interior space and having a channel therein for guiding reference air or a second pressure, and
   a cover which has
      at least one feedthrough bushing for electric leads to the sensing element,
      means for sealing the interior space from the environment of the pressure gage,
      a channel extension extending the channel in the wall to an opening in the cover, and
      an inset which is sealed in the opening in the cover and which
         either is solid to prevent transmission of pressure to the channel
         or has a connecting channel between the channel extension and a lengthening part extending from the inner plane of the cover to the opening in the substrate of the sensing element to guide reference air or the second pressure directly to the inner side of the diaphragm
         or is designed as a second connection for applying the second pressure, said second connection closing the channel extension to prevent transmission of atmospheric pressure to the channel.

2. A pressure gage as claimed in claim 1 wherein portions of the wall are thickened so as to serve as mounting aids.

3. A pressure gage as claimed in claim 2 wherein at least two of the thickened portions are shaped so as to permit the transmission of a screw-in torque.

4. A pressure gage as claimed in claim 3 wherein at least one of the thickened portions has a mounting hole.

5. A pressure gage as claimed in claim 2 wherein the channel runs in one of the thickened portions.

6. A pressure gage as claimed in claim 1 wherein an offset drip edge is provided at the outlet of the channel.

7. A pressure gage as claimed in claim 1 with an inset containing the connecting channel and with a second connection inserted in the outlet of the channel and serving to apply the second pressure.

8. A pressure gage as claimed in claim 1 with an inset containing the connecting channel and with the outlet of the channel located between the diaphragm plane and a mounting plane.

* * * * *

UNITED STATES PATENT AND TRADEMARK OFFICE
CERTIFICATE OF CORRECTION

PATENT NO. : 5,079,953

DATED : January 14, 1992

INVENTOR(S) : Rainer Martin et al

It is certified that error appears in the above-identified patent and that said Letters Patent is hereby corrected as shown below:

On the Title page, the following foreign application priority data should be included: --European Application No. 89810589, Filed August 4, 1989--.

In the Abstract, the last sentence ("This construction serves . . . can be fitted in one of the two main surfaces of the pressure gage") should be deleted.

Column 2, line 36, the numeral "3" should be deleted.

Column 4, line 35, "an inset which is" should be changed to --exchangeable insets which are--.

Column 4, line 37, change "solid" to --a solid inset--.

Column 4, line 39, change "has" to --an inset having--.

Column 4, line 45, after "is", insert --an inset--.

Signed and Sealed this

Twenty-ninth Day of June, 1993

Attest:

MICHAEL K. KIRK

Attesting Officer

Acting Commissioner of Patents and Trademarks